United States Patent

[11] 3,599,194

[72] Inventor George W. Lipscomb
Raleigh, N.C.
[21] Appl. No. 802,534
[22] Filed Feb. 26, 1969
[45] Patented Aug. 10, 1971
[73] Assignee Westinghouse Electric Corporation
Pittsburgh, Pa.

[54] REMOTE REGISTER APPARATUS FOR INTEGRATING DEVICES
7 Claims, 1 Drawing Fig.
[52] U.S. Cl. ............................................. 340/203, 324/139
[51] Int. Cl. ...................................... G08c 19/16, G08c 19/20
[50] Field of Search ............................... 340/203, 193.1, 177 VZ

[56] References Cited
UNITED STATES PATENTS
2,832,067 4/1958 Howe ............... 340/203
3,340,525 9/1967 Probert ............. 340/203

Primary Examiner—Thomas B. Habecker
Attorneys—A. T. Stratton and C. L. Freedman

ABSTRACT: An arrangement is provided for indicating at a remote point the readings of an integrating device such as an electrical watthour meter. The meter may have a register which comprises a train of gears for driving pointers over a series of dials. The pointers coact with the dials to register respectively the digits zero through nine in the various orders such as units, tens, hundreds etc. of the meter reading at any time. A duplicate series of pointers and dials are operated by a motor at a remote point. Two pairs of switches in multiple with each other connect the motor to its power supply. Each pair of switches comprises a switch located at the meter which is operated to closed condition briefly for each occurrence of a predetermined increment in the reading of the meter. Each pair of switches also includes at the remote point a switch which is held closed during a predetermined advance of the remote register and which is held open during the next corresponding advance of the remote register. The arrangement may be such that the switching system causes the units pointer at the remote register to advance a half revolution as soon as the units pointer of the meter registers values of zero and five. In this arrangement, the units pointer at the remote register always reads within five units of the meter register.

PATENTED AUG 10 1971 3,599,194
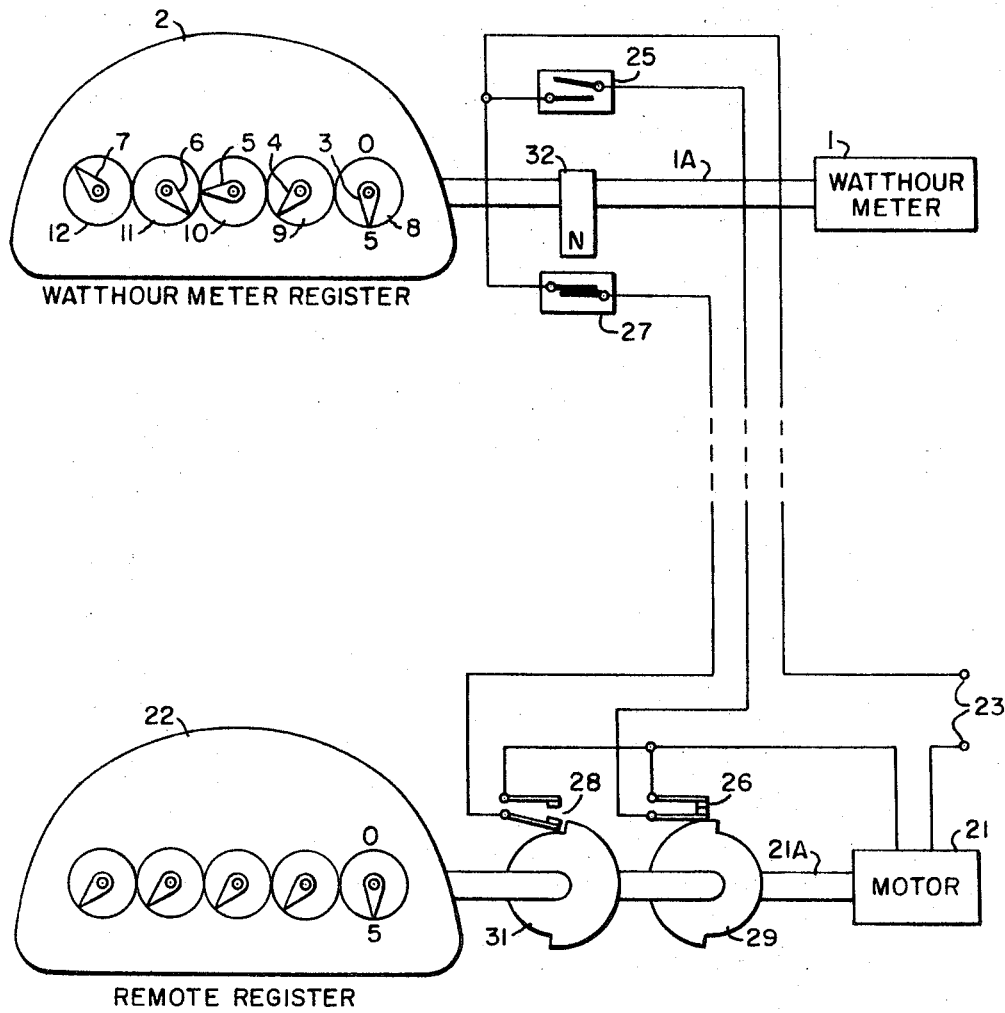
WITNESSES:
Bernard R. Gregory
Leon M. Garman
INVENTOR
George W. Lipscomb
BY ?. L. Freeman
ATTORNEY

REMOTE REGISTER APPARATUS FOR INTEGRATING DEVICES

BACKGROUND OF THE INVENTION

The invention relates to integrating devices which are designed to integrate the value of a variable quantity. Such devices may take the form of water, gas and electric meters which are designed to measure the consumption of water, gas and electricity.

In a conventional watthour meter a register is provided for integrating the value of the electric energy supplied by an electric circuit associated with the watthour meter. Unfortunately, many watthour meters including their registers are located in inaccessible places. Typical examples of relatively inaccessible watthour meter locations are apartment houses wherein the meters are either inside apartments as in the older types of buildings or wherein the meters are located in meter cubicles on each floor of an apartment house.

Attempts have been made to indicate the registration of a meter located at an inaccessible position at a more accessible point such as the basement of an apartment house. This reduces the time required for reading the meters and eliminates the extra cost of "shutouts" wherein the meter reader cannot gain access to the meter. In some cases, a remote register is desirable for a residence having an external meter located at the rear of the residence wherein the meter is made inaccessible by locked gates or watch dogs. Unfortunately, prior attempts to provide remote registers have employed designs which are costly and complex.

SUMMARY OF THE INVENTION

At the end of each predetermined increment of electric energy being measured by the watthour meter, a signal is passed to the remote register. This signal energizes the motor of the remote register for the purpose of advancing the remote register by an amount corresponding to such increment.

In a preferred embodiment of the invention, two switches are provided at the watthour meter. The switches are biased to open condition and the switches are alternately operated to closed condition by the occurrence of the aforesaid increments for the purpose of generating the signals to be transmitted to the remote register.

At the remote register two switches are provided which are alternately closed and opened for each advance of the remote register. The switches are arranged in pairs each pair containing one of the switches at the watthour meter and one of the switches at the remote register. The pairs are connected in parallel to control the energization of the remote register motor.

It is therefore an object of the invention to provide an arrangement for indicating at a remote location the reading of an integrating device.

It is also an object of the invention to provide a remote register for an integrating device wherein the remote register is advanced by a predetermined increment at the end of each increment of advance of a predetermined value by the integrating device.

BRIEF DESCRIPTION OF THE DRAWING

The single FIGURE of the drawing is a diagrammatic illustration of a suitable form of the invention.

DESCRIPTION OF THE PREFERRED EMBODIMENT

Referring in detail to the drawing a meter 1 is illustrated which may be of the well-known induction watthour meter type. This meter includes a register 2 comprising a gear train which moves a series of pointers 3 through 7 over a series of dials 8 through 12. The pointers coact with the dials in a conventional manner to show the watthours measured by the meter 1.

At a remote point where it is desired to indicate at least approximately the reading of the meter 1 a register 22 is provided which may be a replica of the register 2. This register 22 is driven by a self-starting motor 21. The motor 21 is energized from a source 23 which for example may be 120 volt alternating current having a power frequency such as 60 hertz.

Energy is passed from the source 23 to the motor 21 through a transmission channel having two branches in parallel. One branch includes the switches 25 and 26 in series whereas the remaining branch includes the switches 27 and 28 in series. The switch 26 is arranged to be closed and the switch 28 is arranged to be open during a half revolution of the shaft 21A through which the motor 21 drives the register 22. The shaft 21A rotates in unison with the units pointer of the register 22. During the next half revolution of the shaft 21A the switch 26 is open and the switch 28 is closed. As shown in the drawing, the switches are operated respectively by cams 29 and 31 which are mounted on the shaft 21A. The meter 1 is coupled to the register 2 through a shaft 1A on which the units pointer 3 is mounted. The switches 25 and 27 are biased to open condition. Mechanism is provided for closing the switch 25 when the units pointer 3 indicates zero on its dial. The switch 27 is closed when the units pointer 3 indicates the digit 5 on its associated dial. Conveniently the switches 25 and 27 may be of a magnetically operated type and a permanent magnet 32 may be secured to the shaft 1A for operating the switches to closed conditions as desired. Register 22 provides a reading which is within five units of the reading of the meter register 2. Such an accuracy is adequate for the usual application.

The operation of the embodiment shown in the drawing now will be described. Let it be assumed that the units pointer 3 of the meter register 2 points to a digit between 6 and 9 on its associated dial. Under these circumstances the switches 25, 27 and 28 are open and the switch 26 is held closed by its cam 29. The units pointer of the remote register 22 indicated five. The motor 21 is disconnected from its source 23 and the shaft 21A consequently is stationary.

When the units pointer 3 advances to a position corresponding to zero on its dial the permanent magnet 32 closes the switch 25 to complete with the closed switch 26 an energizing circuit for the motor 21. The motor now drives the register 22 until the units pointer advances to zero on its associated dial. At this point, the cam 29 releases the switch 26 which opens to deenergize the motor 21. Just before the switch 26 opens the cam 31 closes the associated switch 28. However, inasmuch as the switch 27 is open the closing of the switch 28 does not complete an energizing circuit for the motor 21 at this time.

As the meter 1 continues to run the permanent magnet 32 leaves the switch 25 and this switch consequently opens. However, such opening has no immediate effect on the operation of the system.

When the units pointer 3 of the meter register 2 advances to the digit 5 on its associated dial the permanent magnet 32 closes the switch 27 to complete with the closed switch 28 an energizing circuit for the motor 21. The motor 21 now drives the remote register 22 until the units pointer reaches the digit 5 on its associated dial. Approximately at this time the cam 31 releases the switch 28 and the switch opens to interrupt the energization of the motor 21. The shaft 21A remains stationary. Just before such opening of the switch 28, the cam 29 closes the switch 26 to prepare for a repetition of the cycle of operation which has just been described.

The embodiment shown in the drawing provides a low cost, compact and reliable arrangement for indicating at a remote point the reading of a meter.

I claim as my invention:

1. A system for transmitting information from a first station to a second station, a first member located at a first station and mounted for rotation about a first axis, a second member located at a second station and mounted for rotation about a second axis, first, second, third and fourth switches, first control means for maintaining said first and second switches open and closing said first and second switches at first and second spaced angular positions of the first member relative to the first axis, second control means for maintaining the third and fourth switches open and closing said third and fourth switches at first and second spaced angular positions of the second member relative to the second axis, a motor for rotating the second member, a source of energy for said motor, means connecting the motor for energization from the source through the first and third switches in series, means connecting the motor for energization from the source through the second and fourth switches in series, and mechanically actuated register means mechanically coupled to said second member and motor for registering the rotation of said motor.

2. A system as claimed in claim 1 wherein said first and second switches are closed respectively when the first member occupies two positions spaced apart by an angle $\theta$ and wherein the first and second switches are open during a major part of the rotation of the first member, said second control means maintaining said third switch open and said forth switch closed for rotation of the second member substantially through an angle equal to said angle $\theta$, and for maintaining the third switch closed and the fourth switch open for rotation of the second member through an angle substantially equal to $360°-\theta$, each of said third and fourth switches closing slightly before the other of said third and fourth switches opens.

3. A system as claimed in claim 2 wherein $\theta=180°$.

4. A system as claimed in claim 3 wherein said first member comprises an indicating member, means cooperating with the indicating member for successively indicating 10 digits 0—9 in one revolution of the first member, said two positions being spaced apart by an angle $\theta$ corresponding to the positions wherein said indicating member indicates 0 and 5.

5. A system as claimed in claim 2 wherein said first member comprises a first register and said register means comprises a second register, and said first and second registers are located respectively at the first and second stations, said registers each having means including a plurality of rotatable indicators each indicating a separate decade of a plural order register, said first and second members comprising respectively the lowest order indicators of the first and second registers.

6. A system as claimed in claim 5 wherein said two positions are spaced apart by an angle $\theta$ corresponding to the positions wherein the associated indicator for the lowest order indicates 0 and 5.

7. A system as claimed in claim 1 wherein a first register is associated with the first member for indicating a quantity dependent on the extent of rotation of the first member, said control means being effective for each advance of the first register by a predetermined increment and before completion of an advance for another equal predetermined increment for advancing the register means by a predetermined increment.